(12) United States Patent
Fox et al.

(10) Patent No.: US 11,442,706 B1
(45) Date of Patent: Sep. 13, 2022

(54) DEVELOPING SOFTWARE PRODUCTS USING REUSABLE CODE ARTIFACTS

(71) Applicant: MASTERCARD TECHNOLOGIES CANADA ULC, Vancouver (CA)

(72) Inventors: Justine Celeste Fox, Pitt Meadows (CA); Marc Grimson, Ithaca, NY (US)

(73) Assignee: MASTERCARD TECHNOLOGIES CANADA ULC, Vancouver (CA)

(*) Notice: Subject to any disclaimer, the term of this patent is extended or adjusted under 35 U.S.C. 154(b) by 0 days.

(21) Appl. No.: 17/331,874

(22) Filed: May 27, 2021

(51) Int. Cl.
*G06F 8/36* (2018.01)
*G06F 8/60* (2018.01)

(52) U.S. Cl.
CPC . *G06F 8/36* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 7,610,577 B1* | 10/2009 | Roth | ...... | G06F 8/71 |
| | | | | 717/106 |
| 11,010,672 B1* | 5/2021 | Hazard | ...... | G06F 8/36 |
| 2018/0225017 A1* | 8/2018 | Latzina | ...... | G06F 8/70 |

OTHER PUBLICATIONS

Kumar, "IExpress in Windows", 2015, C# Corner, Published at https://www.c-sharpcorner.com/UploadFile/bd6c67/iexpress-in-windows/ (Year: 2015).*

* cited by examiner

*Primary Examiner* — Hossain M Morshed
(74) *Attorney, Agent, or Firm* — Michael Best & Friedrich LLP

(57) ABSTRACT

Methods and systems for developing software products from reusable code files. One system includes an electronic processor configured to receive a first selection defining a desired functionality for a new software product and a second selection for the new software product. The electronic processor is also configured to access, from a first repository, a first executable code file based on the first selection and access, from a second repository, a second executable code file based on the second selection. The electronic processor is also configured to aggregate the first executable code file and the second executable code file as the new software product. The electronic processor is also configured to enable deployment of the new software product.

18 Claims, 4 Drawing Sheets

DEVELOPING SOFTWARE PRODUCTS USING REUSABLE CODE ARTIFACTS

FIELD

Embodiments described herein relate to developing software products using reusable code artifacts or files.

BACKGROUND

In the context of developing new software application or products, it is difficult for small development teams to build highly scalable and available end-to-end solutions without compromising some aspect of development. Code reuse, test coverage, load or performance testing, security testing, and the like can become an issue. The solutions for all of these problems are complex and result in small teams maintaining only one product for the lifetime of the team or for organizations to scale and add additional teams for every aspect of development, which creates silos and organizational friction.

SUMMARY

Accordingly, embodiments described herein are directed to creating reusable code artifacts or files that meet stricter requirements around scalability, security, privacy, data localization, and the like. The embodiments described herein consume the reusable code artifacts or files to create new software applications or products over a shorter development period that can exceed existing industry standards for security and privacy. For example, in some embodiments, the methods and systems described herein accomplish this by leveraging evolutionary prototyping combined with artifact inheritance to facilitate rapid development practices. Accordingly, the embodiments described herein provides small teams the ability to own and manage solutions or product offerings for an organization. Embodiments utilize the concept of small repositories with minimal code that can be aggregated to provide rich application functionality using functional application pathways while enabling these small teams to deliver software that is global-scale, self-healing, and auto-scaling with 100% availability. For example, in order for a small team to be effective, a repository layout is key for speeding up development and enabling the team to have any application created to be globally deployable on any infrastructure provider, scale on any compute service, eliminate faults, and the like. Accordingly, the embodiments described herein enable increased efficiency and speed with respect to developing software solutions or products. Additionally, the embodiments described herein enable portability of the developed software solutions or products between multiple cloud service providers.

One embodiment provides a system for developing software products from reusable code files. The system includes an electronic processor configured to receive a first selection defining a desired functionality for a new software product and a second selection for the new software product. The electronic processor is also configured to access, from a first repository, a first executable code file based on the first selection and access, from a second repository, a second executable code file based on the second selection. The electronic processor is also configured to aggregate the first executable code file and the second executable code file as the new software product. The electronic processor is also configured to enable deployment of the new software product.

Another embodiment provides a method for developing software products from reusable code files. The method includes executing, with an electronic processor, a software development application. The method also includes receiving, with the electronic processor, a first selection defining a desired functionality for a new software product. The method also includes receiving, with the electronic processor, a second selection for the new software product. The method also includes accessing, with the electronic processor, a first executable code file based on the first selection. The method also includes accessing, with the electronic processor, a second executable code file based on the second selection. The method also includes aggregating, with the electronic processor, the first executable code file and the second executable code file as the new software product. The method also includes enabling, with the electronic processor, deployment of the new software product.

Yet another embodiment provides a non-transitory, computer-readable medium storing instructions that, when executed by an electronic processor, perform a set of functions. The set of functions includes receiving a first selection defining a desired functionality for a new software product. The set of functions also includes receiving a second selection for the new software product. The set of functions also includes accessing a first executable code file based on the first selection, wherein the first executable code file controls a deployment and configuration of the new software product. The set of functions also includes accessing a second executable code file based on the second selection. The set of functions also includes aggregating the first executable code file and the second executable code file as the new software product, wherein the first executable code file and the second executable code file are reusable code files. The set of functions also includes enabling deployment of the new software product.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Figure 1:
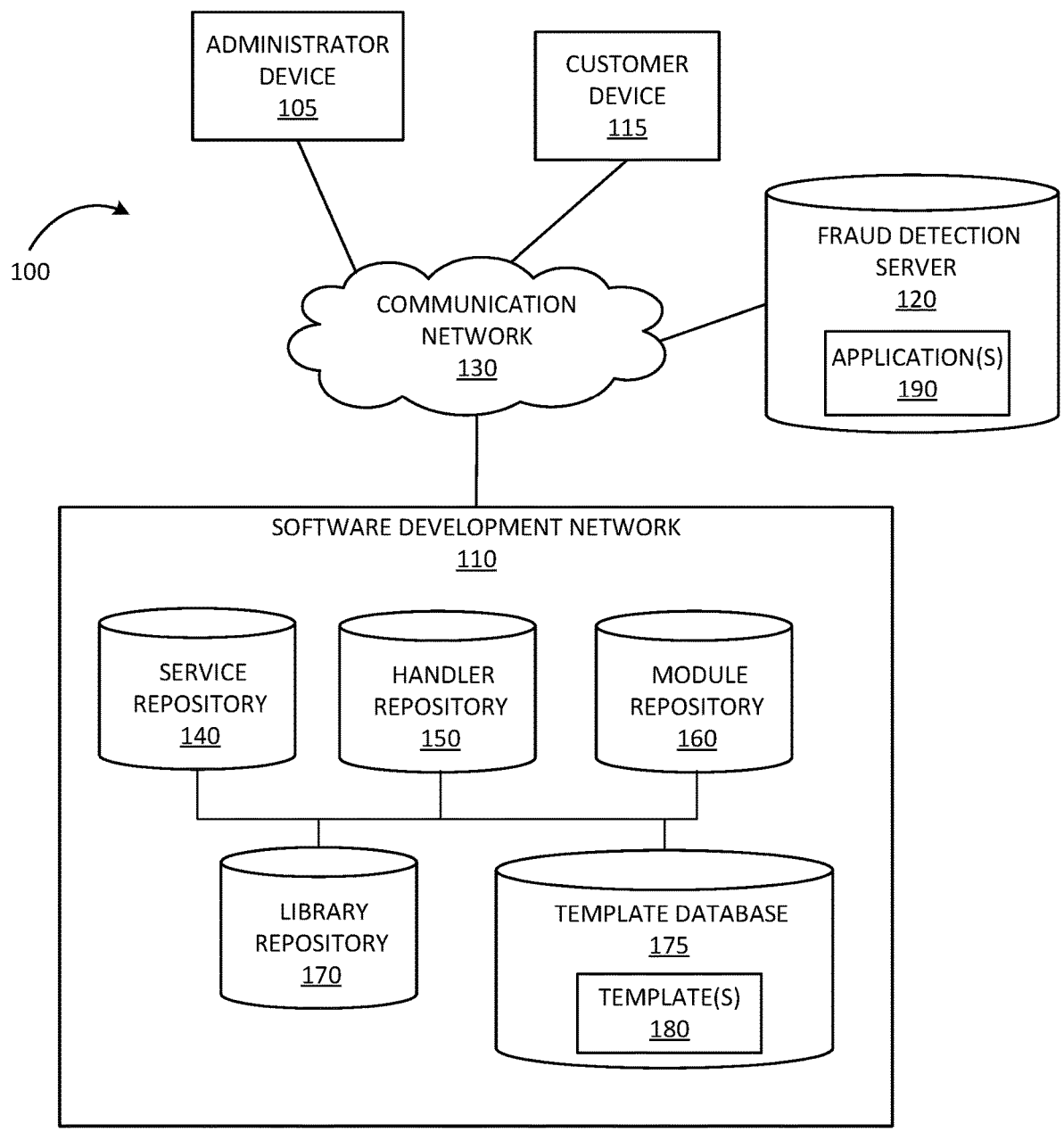
FIG. 1 is a block diagram of a system for developing software products using reusable code files according to some embodiments.

FIG. 1 is a block diagram of a system 100 for developing software products from reusable code files according to some embodiments. In the example shown, the system 100 includes an administrator device 105, a software development network 110, a customer device 115, and a fraud detection server 120. In some embodiments, the system 100 includes fewer, additional, or different components than illustrated in FIG. 1 in various configurations. For example, the system 100 may include multiple administrator devices 105, software development networks 110, customer devices 115, fraud detection servers 120, or a combination thereof. Additionally, in some embodiments, one or more components of the system 100 may be distributed among multiple devices, servers, or databases, combined into a single device, server, or database, or a combination thereof.

The administrator device 105, the software development network 110 (or components thereof), the customer device 115, and the fraud detection server 120 communicate over one or more wired or wireless communication networks 130. Portions of the communication network 130 may be implemented using a wide area network ("WAN"), such as the Internet, a local area network ("LAN"), such as a Bluetooth™ network or Wi-Fi, and combinations or derivatives thereof. Alternatively or in addition, in some embodiments, components of the system 100 communicate directly as compared to through the communication network 130. Also, in some embodiments, the components of the system 100 communicate through one or more intermediary devices not illustrated in FIG. 1.

Figure 2:
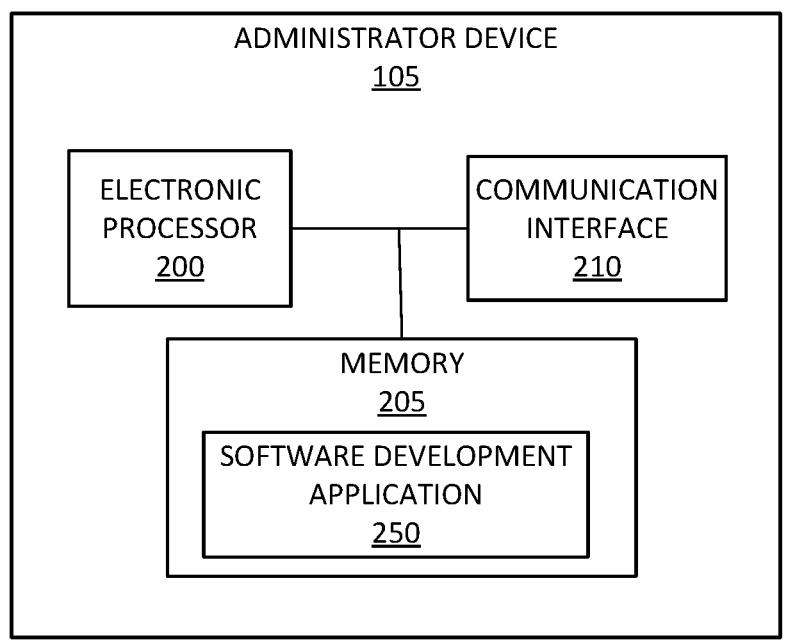
FIG. 2 is a block diagram of an administrator device of the system of FIG. 1 according to some embodiments.

The administrator device 105 may include one or more desktop computers, laptop computers, tablet computers, terminals, smart telephones, smart televisions, smart wearables, servers, databases, other types of computing devices, or a combination thereof. As illustrated in FIG. 2, the administrator device 125 may include an electronic processor 200, a memory 205, and a communication interface 210. The electronic processor 200, the memory 205, and the communication interface 210 communicate wirelessly, over one or more communication lines or buses, or a combination thereof. The administrator device 105 may include additional, fewer, or different components than those illustrated in FIG. 2 in various configurations. For example, the administrator device 105 may also include one or more input devices (keyboard, keypad, mouse, joystick, touchscreen, and the like) and one or more output devices (display device, touchscreen, printer, speaker, and the like) that receive input from a user and provide output to a user.

The electronic processor 200 includes a microprocessor, an application-specific integrated circuit ("ASIC"), or another suitable electronic device for processing data. The memory 205 includes a non-transitory computer readable medium, such as read-only memory ("ROM"), random access memory ("RAM") (for example, dynamic RAM ("DRAM"), synchronous DRAM ("SDRAM"), and the like), electrically erasable programmable read-only memory ("EEPROM"), flash memory, a hard disk, a secure digital ("SD") card, another suitable memory device, or a combination thereof. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as seen in FIG. 2, the memory 205 may store a software development application 250 ("the application 250"). The application 250 is a software application executable by the electronic processor 200. As described in more detail below, the application 250, when executed by the electronic processor 200, enables access to one or more repositories (for example, code repositories) for developing and building a software solution or product. The functionality (or a portion thereof) described herein as being performed by the application 250 may be distributed among multiple software applications. Furthermore, the application 250 may perform additional functionality than the functionality described herein.

An administrator or software developer may use the administrator device 105 (for example, the application 250) for building and developing software solutions, such as a security or anti-fraud service, solution, or product. In some embodiments, an administrator or software developer may use the administrator device 105 to interact with the software development network 110, as seen in FIG. 1. Accordingly, in some embodiments, the administrator device 105 accesses and interacts with the software development network 120 (or one or more components thereof) through the communication network 130. The administrator device 105 may also perform additional functionality other than the functionality described herein. Also, the functionality (or a portion thereof) described herein as being performed by the administrator device 105 may be distributed among multiple devices, such as multiple servers included in a cloud service environment.

The communication interface 210 allows the administrator device 105 to communicate with devices external to the administrator device 105. As one example, as illustrated in FIG. 1, the administrator device 105 may communicate with the customer device 115, one or more components of the software development network 110, the fraud detection server 120, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 130), or a combination thereof.

Returning to FIG. 1, the system 100 includes the software development network 110. The software development network 110 is configured to provide software developers (for example, software development teams) the ability to own and manage solutions or product offerings for an organization. The software development network 110 is implemented through one or more repositories (for example, code repositories). Each repository may store code (for example, one or more executable code files) that may be aggregated to provide rich application functionality using functional application pathways. For example, each repository may store logical arrangements of code. As one example, a service repository may store information regarding deployment, a handler repository may store code for handling incoming requests, a module repository may store business logic, workflow logic, and the like, and a library repository may store baseline technologies, such as database connectors, database schemas, data structures, and the like. Repository boundaries may enforce project isolation and define dependencies through project configuration, which allows for projects to be split into subcomponents and distributed repositories. Accordingly, in some embodiments, the software development network 110 provides quick start blueprints or templates for repositories (for example, patterns for solving common software deployments, such as APIs, websites, dashboards, mobile applications and the like). Repositories may be used to power framework functionality. Additionally, in some embodiments, common use cases (for example, common software challenges such as counting occurrences in a distributed computing environment) are supported through the templates for the repositories.

In the illustrated example of FIG. 1, the software development network 110 includes a service repository 140, a handler repository 150, a module repository 160, and a library repository 170. In some embodiments, the software development network 110 includes fewer, additional, or different components than illustrated in FIG. 1 in various configurations. For example, the software development network 110 may include multiple service repositories 140, handler repositories 150, module repositories 160, library repositories 170, or a combination thereof. Additionally, in some embodiments, one or more components of the software development network 110 may be distributed among multiple repositories (for example, as part of a cloud service or cloud-computing environment), combined into a single repository, or a combination thereof.

Although not illustrated, the service repository 140, the handler repository 150, the module repository 160, the library repository 170, or a combination thereof may include similar components as the administrator device 105, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces. The service repository 140, the handler repository 150, the module repository 160, the library repository 170, or a combination thereof may also perform additional functionality other than the functionality described herein.

The service repository 140 controls the overall solution or product being developed or built, including, for example, which handlers (or endpoints) make up the functionality of the solution or product, where the solution or product is deployed, other global settings for the solution or product, and the like. As one example, the service repository 140 may include one or more executable code files for a solution that helps customers prevent account takeover attacks by providing real-time or batch threat intelligence to their application.

The handler repository 150 stores functionality (for example, executable code files) required for a single web path using a microservice or modern application compliant architecture. In some embodiments, a handler does one pathway such as HTTP GET/base-path/example-ids. Additionally, in some embodiments, a handler includes as many modules as needed to provide the desired functionality for a single task. As one example, the handler repository 150 may include a function (for example, as an executable code file) that resolves requests to HTTP GET/threat-intel/10.0.0.1 and provides value-added functionality to a customer.

The module repository 160 stores an abstraction interface for working with data structures or lower level functionality. A module may include multiple libraries. Common functionality provided by a module may be CRUD-based. Modules may focus on how one task might work with multiple underlying systems. As one example, the module repository 160 may include an abstraction layer over database connections (for example, NoSQL document databases). In some embodiments, this hides implementation details between underlying system details or exact database technology.

The library repository 170 provides a data object, another primitive (for example, a database connection or web request), or a combination thereof. As one example, the library repository 170 provides a specific database connection data object, such as for Cassandra, Mongo, DynamoDB, or Cosmos DB.

As seen in FIG. 1, the software development network 110 may also include a template database 175. The template database 175 may store one or more templates 180. A template 180 may provide a blueprint or sample of how a software module or component is built. As one example, a template 180 may describe a common library, such as the components of a common library, how the common library is built, defines connections between the common library and another component or software module, and the like. Accordingly, a template 180 may serve as a road map or blueprint such that a software developer is able to develop a corresponding software module or component.

The fraud detection server 120 may include one or more desktop computers, laptop computers, tablet computers, terminals, smart telephones, smart televisions, smart wearables, servers, databases, other types of computing devices, or a combination thereof. Although not illustrated in FIG. 1, the fraud detection server 120 may include similar components as the administrator device 105, such as an electronic processor, a memory, and a communication interface. The fraud detection server 120 may also include one or more input devices (for example, a keyboard, a keypad, a mouse, a joystick, a touchscreen, and the like) and one or more output devices (for example, a display device, a touchscreen, a printer, a speaker, and the like) that receive input from a user and provide output to a user. In some embodiments, the fraud detection server 120 is part of a computing network, such as a distributed computing network, a cloud computing service, or the like. The fraud detection server 120 may also perform additional functionality other than the functionality described herein. Also, the functionality (or a portion thereof) described herein as being performed by the fraud detection server 120 may be distributed among multiple devices, such as multiple servers included in a cloud service environment.

The fraud detection server 120 stores and provides a plurality of applications 190 (referred to herein collectively as "the applications 190" and individually as "an application 190"). An application 190 is a software application executable by an electronic processor of the fraud detection server 120. An application 190, when executed by an electronic processor, performs one or more security or anti-fraud functions, such as fraud detection, fraud monitoring, and the like. For example, an application 190 may support account takeover prevention, fraudulent account creation prevention, and the like. In some embodiments, the fraud detection server 120 supports multiple applications 190. However, in other embodiments, the system 100 may include multiple fraud detection servers 120 each providing a different application 190. As one example, the system 100 may include a first fraud detection server 120 providing an account takeover prevention application (a first application 190), a second fraud detection server 120 providing an online account origination application (a second application 190), and the like.

The customer device 115 may include one or more desktop computers, laptop computers, tablet computers, terminals, smart telephones, smart televisions, smart wearables, servers, databases, other types of computing devices, or a combination thereof. Although not illustrated in FIG. 1, the customer device 115 may include similar components as the administrator device 105, such as an electronic processor, a memory, and a communication interface. The customer device 115 may also include one or more input devices (keyboard, keypad, mouse, joystick, touchscreen, and the like) and one or more output devices (display device, touchscreen, printer, speaker, and the like) that receive input from a user and provide output to a user.

The customer device 115 may provide an application or service (such as a cloud-based service) to a user or customer (for example, an end user, a group of users, an organization, another user entity, or the like). As one example, an entity, such as a financial institute, may manage the customer device 115 to provide a financial service (for example, an online banking service, a financial account management service, or the like). A user (for example, an end-user) may interact with the customer device 115 (in this example, the financial service) either directly via an input/output device of the customer server 105 or indirectly via one or more intermediary devices (for example, a user device associated with the user). In some embodiments, the customer device 115 is part of a computing network, such as a distributed computing network, a cloud computing service, or the like. The customer device 115 may communicate with the administrator device 105, the software development network 110 (or a component thereof), the fraud detection server 120, or a combination thereof as part of providing a cloud-based service to a user using an intermediary device (for example, a user device associated with the user). In some embodiments, the customer device 115 may communicate with the fraud detection server 120 to leverage fraud detection services provided via the application(s) 190 of the fraud detection server 120 and associated data. Accordingly, in some embodiments the fraud detection server 120 is a cloud-based service or application provided through (or accessible by) a customer environment (for example, the customer device 115).

Figure 3:
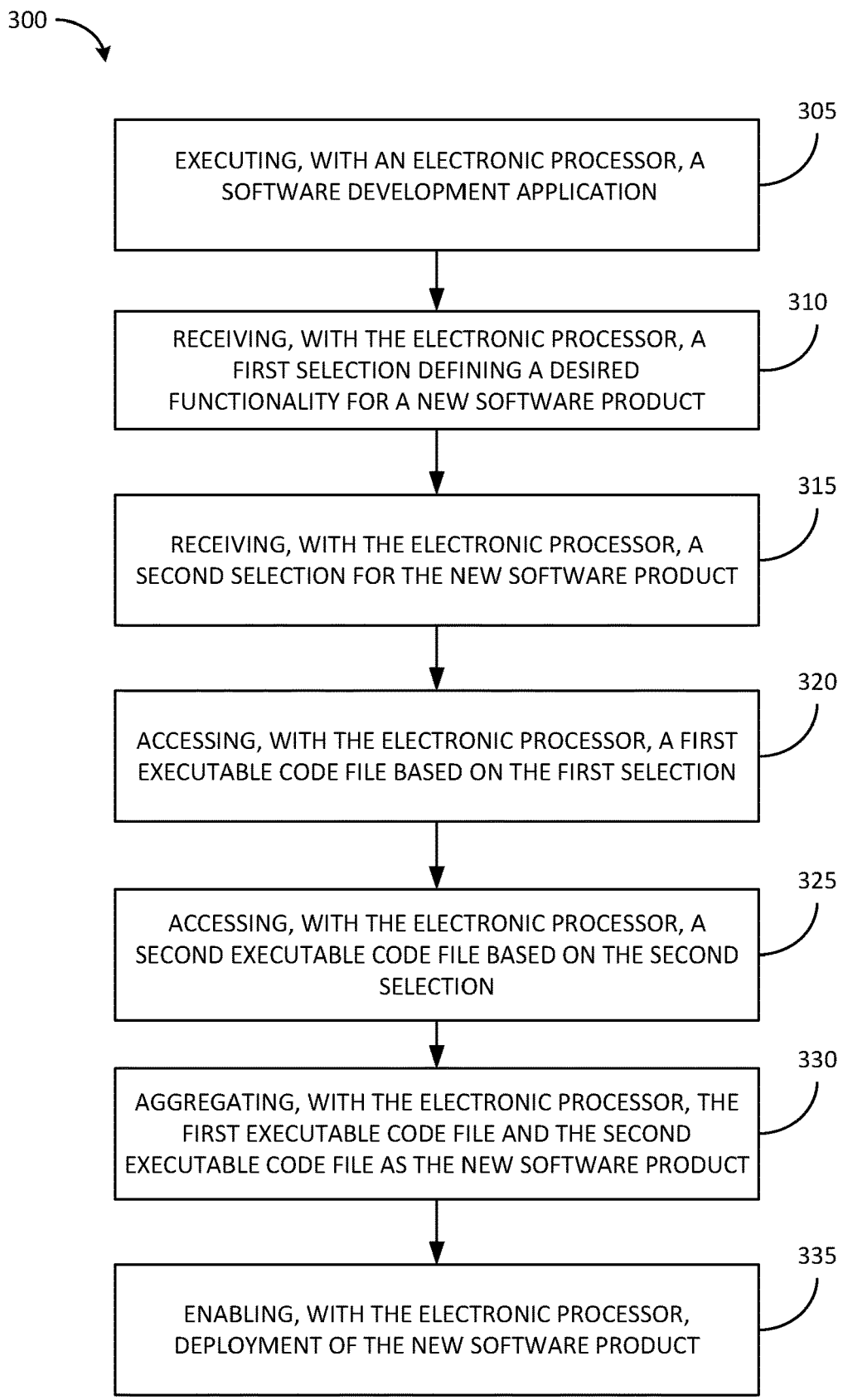
FIG. 3 is a flow chart of a method of developing software products using reusable code files using the system of FIG. 1 according to some embodiments.

FIG. 3 is a flowchart illustrating a method 300 for developing software products using reusable code files according to some embodiments. The method 300 is described as being performed by the administrator device 105 and, in particular, the electronic processor 200 through execution of the application 250. However, as noted above, the functionality performed by the administrator device 105 (or a portion thereof) may be performed by other devices (via an electronic processor executing instructions), including, for example, one or more components of the software development network 110, the customer device 115, the fraud detection server 120, or a combination thereof.

As seen in FIG. 3, the method 300 includes executing, with the electronic processor 200, the software development application 250 (at block 305). As noted above, the application 250, when executed by the electronic processor 200, enables access to one or more repositories (for example, the service repository 140, the handler repository 150, the module repository 160, the library repository 170, or a combination thereof) for developing and building a software solution or product (for example, a new software product). Accordingly, in some embodiments, the administrator device 105 (via the application 250) accesses and interacts with the software development network 120 (or one or more components thereof) through the communication network 130.

The electronic processor 200 may receive a first selection defining a desired functionality for a new software product (at block 310) and a second selection for the new software product (at block 315). The first selection, the second selection, or a combination thereof may be received from a user of the administrator device 105, such as one or more input devices of the administrator device 105. The electronic processor 200 may then access a first executable code file based on the first selection (at block 320) and a second executable code file based on the second selection (at block 325). In some embodiments, the electronic processor 200 accesses the first executable code file from the service repository 140 (for example, a first repository). In such embodiments, the first executable code file controls a deployment and configuration of the new software product. The electronic processor 200 may access the second executable code file from the handler repository 150 (for example, a second repository). In such embodiments, the second executable code file provides functionality for a web path.

Alternatively or in addition, in some embodiments, the electronic processor 200 may receive one or more additional selections for the new software product (for example, a third selection, a fourth selection, and the like). In response to receiving the one or more additional selections, the electronic processor 200 may access one or more additional executable code files (for example, a third executable code file, a fourth executable code file, and the like). Accordingly, in some embodiments, the electronic processor 200 interacts with one or more additional repositories (for example, a third repository, a fourth repository, and the like). As one example, the electronic processor 200 may receive a third selection for the new software product. In response to receiving the third selection, the electronic processor 200 may access a third executable code file from a third repository, such as the module repository 160, the library repository 170, or the like. According to this example, the third executable code file may provide an abstraction interface for a data object, provide a data object, or the like.

Accordingly, in some embodiments, the executable code files (for example, the first executable code file, the second executable code file, the third executable code file, and the like) are reusable code files. Alternatively or in addition, the executable code files (for example, the first executable code file, the second executable code file, the third executable code file, and the like) are developed using evolutionary prototyping.

After accessing the first executable code file and the second executable code file, the electronic processor 200 aggregates the first executable code file and the second executable code file as the new software product (at block 330). In some embodiments, the electronic processor 200 aggregates the first executable code file, the second executable code file, and any additional executable code files by compiling the executable code files into a single executable code file configured to perform the desired functionality of the new software product.

In some embodiments, the electronic processor 200 enables deployment of the new software product (at block 335). The electronic processor 200 may enable deployment of the new software product by storing the new software product (for example, in the memory 205 or a remote storage device), transmitting the new software product to a remote device, or a combination thereof. As one example, the electronic processor 200 may transmit the new software product to the fraud detection server 120 for deployment (for example, as a new application 190). In response to receiving the new software product, the fraud detection server 120 may implement or deploy the new software product. For example, the fraud detection server 120 may enable access to the functionality of the new software product to, for example, a user associated with the customer device 115. Alternatively or in addition, the electronic processor 200 may transmit the new software product directly to the customer device 115 (or another device) for implementation and deployment.

Figure 4:
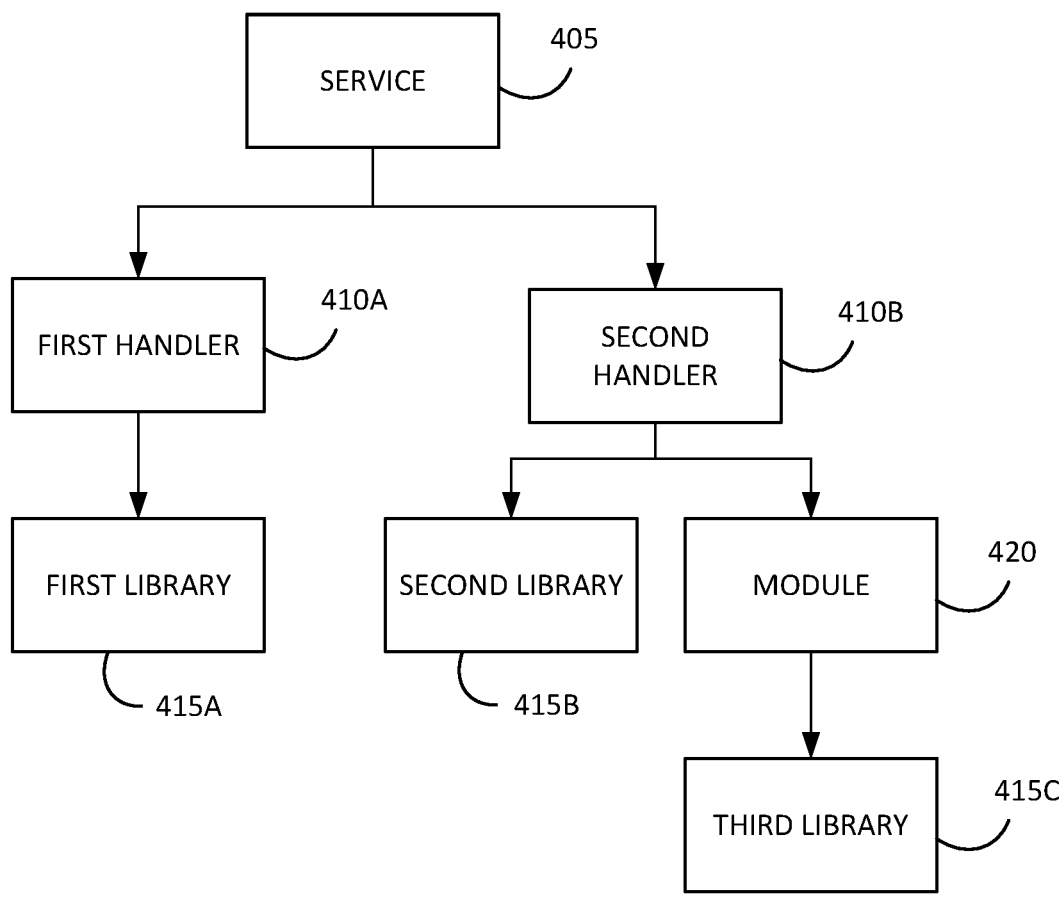
FIG. 4 schematically illustrates components of a new software product according to some embodiments.

FIG. 4 schematically illustrates example components of a new software product developed using the method 300 of FIG. 3. As seen in FIG. 4, the new software product includes a service component 405 (accessed from the service repository 140). The service component 405 controls a deployment and configuration of the new software product. The new software product also includes a first handler 410A and a second handler 410B (accessed from the handler repository 150). The first handler 410A and the second handler 410B provide the desired functionality for a task of the new software product. The first handler 410A interacts with the first library 415A (accessed from the library repository 170). The second handler 410B interacts with a second library 415B as well as a third library 415C through a module 420 (accessed from the module repository 160). It should be understood that, although not illustrated in FIG. 4, in some embodiments, a library repository and a module repository may be shared across handlers.

Thus, the embodiments described herein provide, among other things, methods and systems for developing software products using reusable code files.

It is to be understood that the embodiments described herein is not limited in its application to the details of construction and the arrangement of components set forth in the description or illustrated in the accompanying drawings. The embodiments described herein are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Various features and advantages of the embodiments are set forth in the following claims.

What is claimed is:

1. A system for developing software products from reusable code files, the system comprising:
an electronic processor configured to
receive a first selection defining a desired functionality for a new software product, wherein the first executable code file controls a deployment and configuration of the new software product,
receive a second selection for the new software product,
access, from a first repository, a first executable code file based on the first selection,
access, from a second repository, a second executable code file based on the second selection,
aggregate the first executable code file and the second executable code file as the new software product, and
enable deployment of the new software product.

2. The system of claim 1, wherein the first executable code file and the second executable code file are reusable code files.

3. The system of claim 1, wherein the first executable code file and the second executable code file are developed using evolutionary prototyping.

4. The system of claim 1, wherein the second executable code file provides functionality for a web path.

5. The system of claim 1, wherein the electronic processor is further configured to
receive a third selection for the new software product, and
access, from a third repository, a third executable code file based on the first selection.

6. The system of claim 5, wherein the third executable code file provides an abstraction interface for a data object.

7. The system of claim 5, wherein the third executable code file provides a data object.

8. A method for developing software products from reusable code files, the method comprising:
executing, with an electronic processor, a software development application;
receiving, with the electronic processor, a first selection defining a desired functionality for a new software product, wherein accessing the first executable code file includes accessing an executable code file that controls a deployment and configuration of the new software product;
receiving, with the electronic processor, a second selection for the new software product;
accessing, with the electronic processor, a first executable code file based on the first selection;
accessing, with the electronic processor, a second executable code file based on the second selection;
aggregating, with the electronic processor, the first executable code file and the second executable code file as the new software product; and
enabling, with the electronic processor, deployment of the new software product.

9. The method of claim 8, wherein accessing the second executable code file includes accessing an executable code file that provides functionality for a web path.

10. The method of claim 8, further comprising:
receiving, with the electronic processor, a third selection for the new software product; and
accessing, with the electronic processor, a third executable code file based on the first selection.

11. The method of claim 10, wherein accessing the third executable code file includes accessing an executable code file that provides an abstraction interface for a data object.

12. The method of claim 10, wherein accessing the third executable code file includes accessing an executable code file that provides a data object.

13. A non-transitory, computer-readable medium storing instructions that, when executed by an electronic processor, perform a set of functions, the set of functions comprising:
receiving a first selection defining a desired functionality for a new software product;
receiving a second selection for the new software product;
accessing a first executable code file based on the first selection, wherein the first executable code file controls a deployment and configuration of the new software product;
accessing a second executable code file based on the second selection;
aggregating the first executable code file and the second executable code file as the new software product, wherein the first executable code file and the second executable code file are reusable code files; and
enabling deployment of the new software product.

14. The computer-readable medium of claim 13, wherein accessing the second executable code file includes accessing an executable code file that provides functionality for a web path.

15. The computer-readable medium of claim 13, wherein the set of functions further comprises:
receiving, with the electronic processor, a third selection for the new software product; and
accessing, with the electronic processor, a third executable code file based on the first selection.

16. The computer-readable medium of claim 15, wherein accessing the third executable code file includes accessing an executable code file that provides an abstraction interface for a data object.

17. The computer-readable medium of claim 15, wherein accessing the third executable code file includes accessing an executable code file that provides a data object.

18. The computer-readable medium of claim 13, wherein accessing the first executable code file and the second executable code file include accessing executable code files developed using evolutionary prototyping.

* * * * *